United States Patent [19]

Jeng et al.

[11] Patent Number: 5,027,304
[45] Date of Patent: Jun. 25, 1991

[54] CHARACTER MULTIFONT COMPRESSION AND RESTORATION DEVICE

[75] Inventors: Bor-Shenn Jeng; Gan-How Change; Kuange-Yao Chang; Chih-Yen Yan; Tieh-Min Wu; Jang-Keng Lin, all of Tao Yuan Hsien, Taiwan

[73] Assignee: Telecommunication Laboratories, Directorate General of Telecommunications, Ministry of Communications, Taiwan

[21] Appl. No.: 345,710

[22] Filed: May 1, 1989

Related U.S. Application Data

[63] Continuation-in-part of Ser. No. 104,042, Oct. 2, 1987, abandoned.

[51] Int. Cl.$^5$ ............................................. G06F 15/20
[52] U.S. Cl. .................................... 364/518; 364/521
[58] Field of Search ............... 364/518, 521; 340/709, 340/739; 382/9

[56] References Cited

U.S. PATENT DOCUMENTS

| | | | |
|---|---|---|---|
| 4,298,945 | 11/1981 | Kyte et al. | 364/523 |
| 4,675,830 | 6/1987 | Hawkins | 364/518 |
| 4,703,438 | 10/1987 | Nishiyama et al. | 364/518 X |
| 4,723,217 | 2/1988 | Nakano et al. | 364/518 |
| 4,907,282 | 3/1990 | Daly et al. | 364/518 X |

Primary Examiner—Heather R. Herndon
Attorney, Agent, or Firm—Wenderoth, Lind & Ponack

[57] ABSTRACT

A realtime generating system for generating printed Chinese characters with multifonts and multiresolutions, includes a Chinese character compression sub-system and a printed Chinese character realtime generating sub-system. The former sub-system is used to compress the dot matrix characters into a character vector, and to store the character vector in the ROM (read only memory) of the latter sub-system. The compressed character vector is retrieved from the ROM and converted into a character outline in accordance with a Chinese character code and the specific resolution. The character outline is then processed through the steps of enlarging or shrinking, and filling to form a printed Chinese character.

10 Claims, 7 Drawing Sheets

PROTRUSION POINT    RECESS POINT

FIG. 5(c)

| P1 | P2 | P3 |
|----|----|----|
| P8 | P  | P4 |
| P7 | P6 | P5 |

CHARACTER MULTIFONT COMPRESSION AND RESTORATION DEVICE

CROSS-REFERENCE TO RELATED APPLICATION

This is a Continuation-In-Part of application Ser. No. 07/104,042, filed Oct. 2, 1987, now abandoned.

BACKGROUND OF THE INVENTION

1. Field of the Invention

The present invention relates to a realtime generating system for generating high quality printed multifont and multiresolution Chinese characters.

2. Statement of the Prior Art

Chinese character pattern generation in a personal computer system is becoming more and more important for realtime Chinese information processing. The current approaches to the generation of Chinese character patterns in personal computers have many drawbacks. The ordinary Chinese character generating card in a personal computer system uses a "dot matrix" method. Since the dot matrix necessitates very large storage space in the computer, this method can only generate a single resolution and single style Chinese character. Some Chinese character generating systems use the "B-spline" method instead of the entire dot matrix. Such systems require a much smaller storage space and can generate multifont Chinese characters with multiresolutions. However, the Chinese character pattern is generated by means of a mathematical equation, which limits the ability to form a good looking Chinese character pattern. Moreover, the control points for a character must be chosen manually. Therefore, the quality of the Chinese characters generated thereby is rather difficult to control and the resultant appearance of a character isn't smooth. Furthermore, it cannot generate some of the Chinese character styles, such as the normal style, the running style, and the official style (clerical style), etc. According to the present invention, the aforesaid drawbacks are eliminated by means of a simple hardware circuit, in which high-quality Chinese multifont multiresolution characters multiresolution can be generated in realtime. The present invention is particularly useful for PC systems.

SUMMARY OF THE INVENTION

The present invention comprises two sub-systems, i.e., a Chinese character compression sub-system, and a printed Chinese character realtime generating sub-system. The Chinese character compression sub-system stores a dot matrix character having one resolution by converting a character pattern into a character outline, and then compressing the character pattern into vector, which is then stored in a ROM. The generating sub-system retrieves, upon being provided with a Chinese character code and the specific resolution, the compressed character vector from the ROM and converts the vector into a character outline. The outline is enlarged or shrunk by means of the vector method into a specific resolution, and the outline in then filled to form the character pattern required. All the processing steps of the printed Chinese character realtime generating sub-system are accomplished in a function card in a PC. The advantages of the present invention in comparison with that of the conventional Chinese character generating systems are as follows:

1. The compressed character vector in the present invention is generated automatically by the computer. The quality of the character pattern is easy to control. The present invention reduces the manpower required to do the correcting and thereby reduces costs.

2. The present invention requires a very short time to make a compressed character patterns vector of a given character style. At the present time, at least 1000 characters can be made in one day.

3. The present invention uses a simple method without using the complicated mathematical equations. The Chinese character pattern can be generated by means of the compressed character pattern vector. The character pattern includes the Ming-dynasty style, the boldface style, the Sung-dynasty style, the formal style, the running style, the official style (clerical style), the seal character and the grass style and others.

4. The character pattern generated is visually appealing.

5. By means of a one resolution compressed character vector, a multiresolution Chinese character pattern can be generated by means of an enlarging or shrinking method, thereby reducing the amount of storage space required.

6. Since the Chinese printed character realtime generating sub-system mounted on a circuit board in a PC, it is not necessary to have a large computer storage means in the present invention.

BRIEF DESCRIPTION OF THE DRAWINGS

FIGS. 5(a)-5(e) are diagrams for explaining the operation of the outline vector generating module according to the present invention.

DETAILED DESCRIPTION

Figure 1:
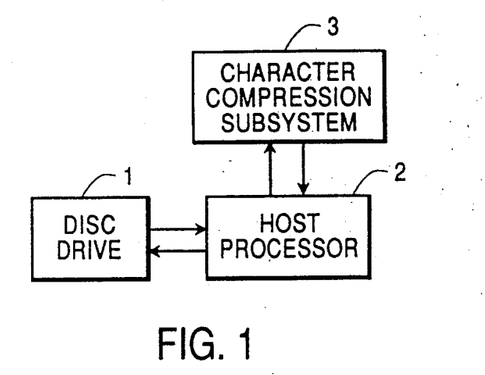
FIG. 1 is a block diagram of the sub-system for compressing the Chinese characters according to the present invention.

The present invention mainly comprises two sub-systems, i.e., a Chinese character compression sub-system and a printed Chinese character realtime generating sub-system. A dot matrix Chinese character is first converted into a compressed Chinese character vectors by the Chinese character compression sub-system. The compressed Chinese character vectors are then stored in a ROM. As soon as the read-in is completed, a high quality Chinese multifont, multiresolution character is generated by the printed Chinese character realtime generating sub-system. FIG. 1 illustrates the Chinese character compression sub-system, which comprises:

1. A disk drive 1 for storing the dot matrix Chinese characters and the compressed Chinese character vector;

2. A host processor for controlling the operation of the Chinese character compression module.

3. A Chinese character compression module 3 for compressing the dot matrix Chinese characters into a vector form so as to occupy less storage space.

Figure 2:
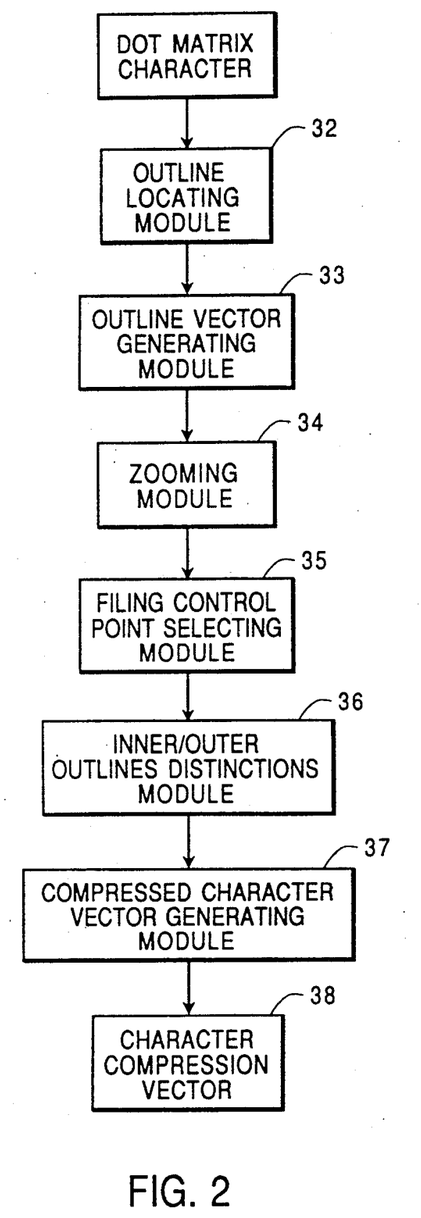
FIG. 2 is a block diagram of the Chinese character compressing module according to the present invention.

FIG. 2 is a block diagram of the Chinese character compression module 3. Each of the illustrated modules is a separate firmware entity. First, a dot matrix character is inputted to the compression module 3 from a personal computer (PC) main system via an I/O port. The host processor 2 then controls the activation of each module. As each module completes its specified operation, it informs the host processor 2 which in turn activates the next module. Upon completion of the character compression, the PC main system is so informed by the host processor, and the compressed character data is transmitted to the PC main system via the I/O port.

Each of the modules illustrated in FIG. 2 are described in detail below.

Figure 4A:
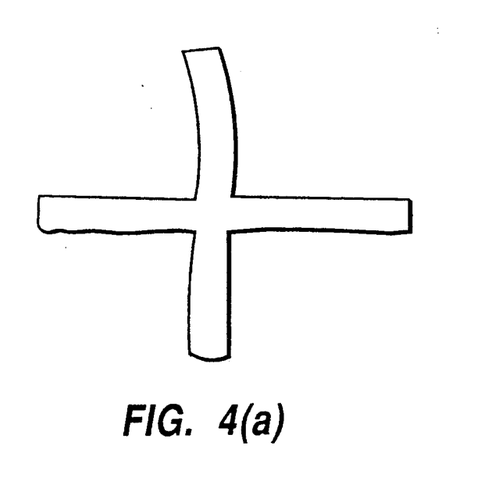
FIGS. 4(a)-4(e) are diagrams for explaining the operation of the outline locating module according to the present invention.

As previously indicated, the dot matrix character is inputted into the outline locating module 32. The outline locating module 32 locates the stroke outline (or contour) of the Chinese character by first registering each pair of inputs of each of the horizontal segments of the Chinese character, and then registering each pair of end points of each vertical segment of the Chinese character. For example, the Chinese character shown in FIG. 4(a) would be represented as shown in FIG. 4(b).

Figure 4B:
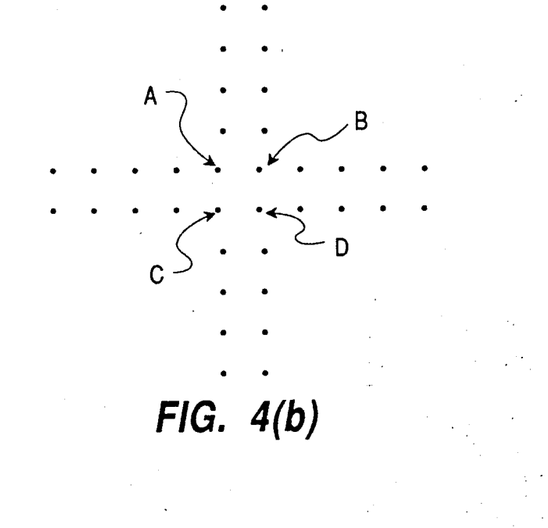
Figure 4C:
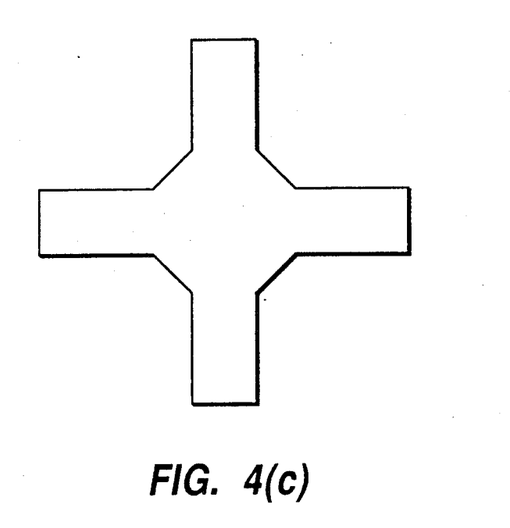

The aforementioned method can locate most of the stroke outline, however, points A-D as shown in FIG. 4(b) cannot be located according to this method. These points A-D are referred to as cross points. They are particularly important when the contour is enlarged. That is, if they are not taken into account, the resultant enlarged character becomes as shown in FIG. 4(c).

Figure 4D:
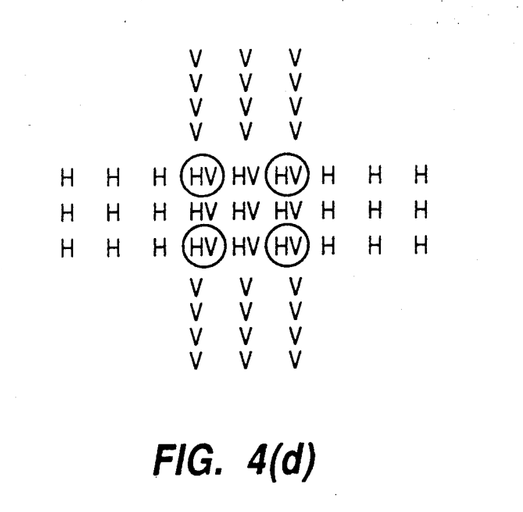

Accordingly, the cross points must be found and registered. This is accomplished by dividing each segment according to its length, i.e., long, middle, and short. That is, as shown in FIG. 4(d), each of the points of a horizontal long segment is designated as "H", and each of the points of a vertical long segment are designated as "V". Additionally, each of those points which exists in both a vertical long segment and a horizontal long segment are designated as "HV". Accordingly, a cross area can be located, and the cross points can therefore be located by referring to the foregoing contour points.

Figure 4E:
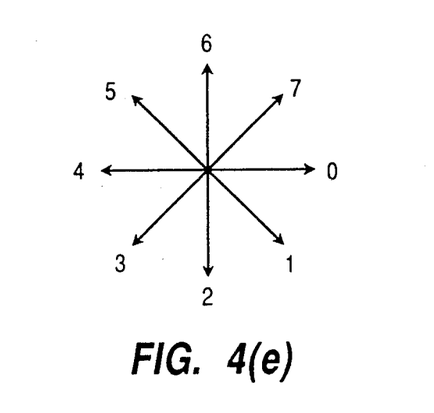

The outline locating module 32 then records, using the frame-surrounding method, the orientation of the lines of the character from the upper side to the lower side of the character and from the left side to the right side of the character. The orientation of lines includes eight directions having direction codes as shown in FIG. 4(e).

Figure 5A:
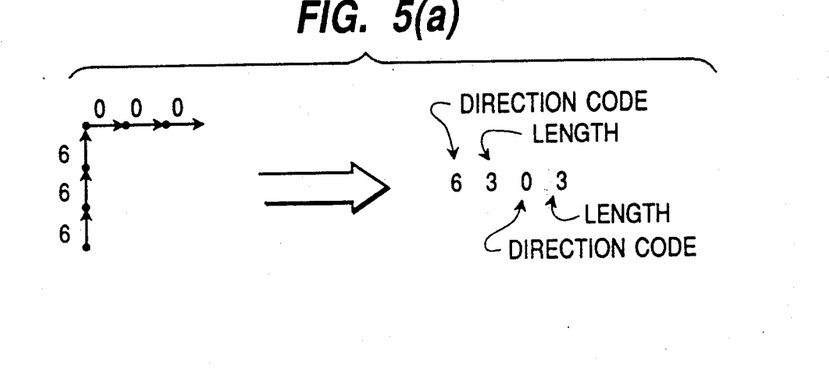
Figure 5B:
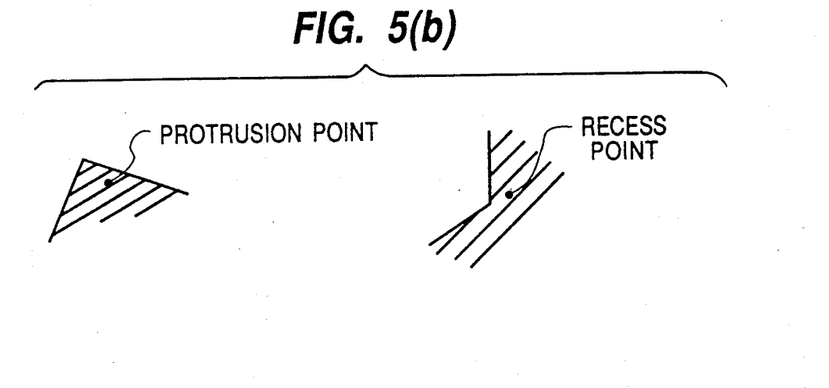

The outline vector generating module produces contour vectors and further compresses the acquired contour data. That is, module 33 combines successive segments having the same direction into one segment and records the direction code and length thereof. The direction code represents the direction change as shown in FIG. 5(a). Furthermore, module 3 smooths the denticulate portions caused by digitization of diagonal strokes of the Chinese character, for example, protrusion points and recess points as shown in FIG. 5(b). The recess point is so defined that the line segment between any two points located respectively on two sides of a recess point will go through the outer part of the character. The protrusion, of course, is oppositely defined. The aforesaid smoothing is achieved by means of eliminating some recess points to form a somewhat longer segment. A recess point is first selected, and then the slopes of the selected point and its neighboring six points are calculated. If their slopes are relatively the same, the recess point is then eliminated. This procedure is repeated until all such recess points have been deleted.

Figure 5C:
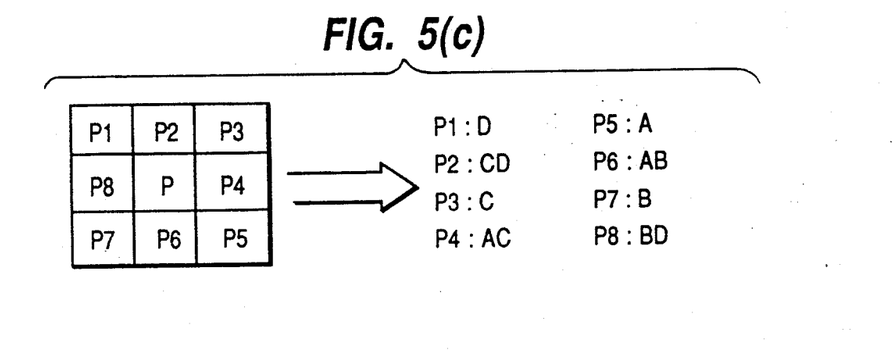
Figure 5D:
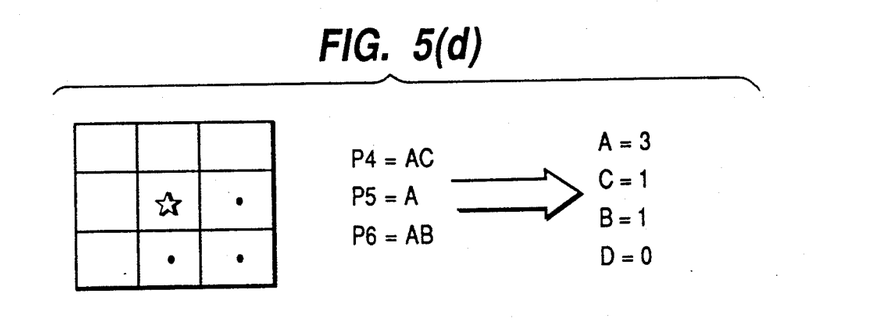

Module 33 further determines the type of each point. Since a new coordinate is otherwise calculated when enlarging or narrowing each point, the points are classified into four types A, B, C, and D. A point type is classified according to the eight direction points, as shown in FIG. 5(c). If P1 appears to be a black point, then 1 is added to the D value. If P2 appears to be a black point, then 1 is added to the C and D values respectively. Thus, each value of A, B, C, and D is determined. An example of the values of a A, B, C, and D is shown as in FIG. 5(d).

The formulas for enlarging and narrowing each type of point are as shown below:

| A: | $x' = (x - 1) * \text{ratio} + 1$ |
| --- | --- |
|  | $y' = (y - 1) * \text{ratio} + 1$ |
| B: | $x' = (x - 1) * \text{ratio} + 1$ |
|  | $y' = y * \text{ratio}$ |
| C: | $x' = x * \text{ratio}$ |
|  | $y' = (y - 1) * \text{ratio} + 1$ |
| D: | $x' = x * \text{ratio} + 1$ |
|  | $y' = y * \text{ratio}$ |

The zooming module 34 enlarges or shrinks the outline into various resolutions so as to select a suitable outline filling control point in the outline of various resolutions. The zooming method is done according to a coordinate transformation equation so as to transform the point coordinate on the outline into a coordinate of a varying resolution. That is, module 34 enlarges and narrows the contours acquired from the equations shown above into various resolutions, and then locates the appropriate contour filling control point among these contours.

Figure 6A:
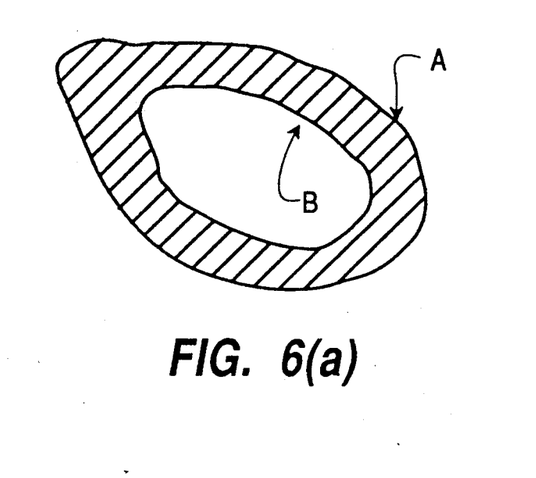
FIGS. 6(a)-6(b) are diagrams for explaining the operation of the outline distinction module according to the present invention.

The filling control point selecting module is used to select the filling control points. That is, in the interior of the contour a blank point is located which is farthest away from the edge of the contour. This point is considered to be the best filling control point for enlarging or narrowing a character, as this point will not possibly fall outside the contour. This point is further checked to determine if it remains the best filling control point in the character contour at various resolutions after enlarging or narrowing of the character. If it is not the best filling control point at various resolutions, a new filling control point is repeatedly located in the same manner until all of the best filling control point at each resolution is located. The inner/outer outline distinction module is used to identify the inner and outer contour. That is, since some strokes form loops, inner and outer contours occur as shown in FIG. 6(a). As shown, contour A is the outer contour, and contour B is the inner contour. They are distinguished by module 36 in the following manner.

Figure 6B:
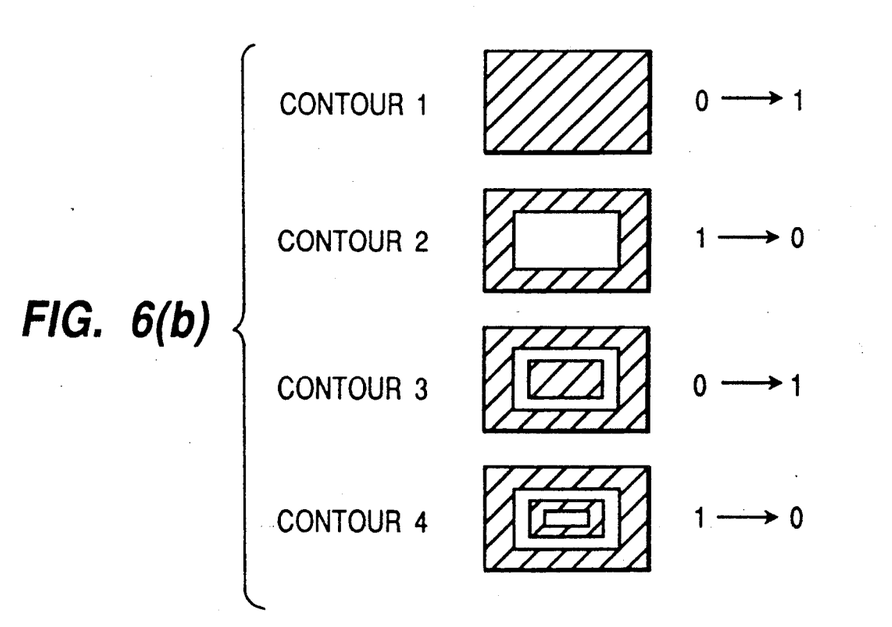

Referring to FIG. 6(b), the character area is first entirely filled with 0. Then one contour is taken out and the points contained therein are converted from 1 to 0 or from 0 to 1. The successive contours are then taken out according to the same procedure until all such contours are finished. If 0 is converted to 1, the contour is an outer 1, and otherwise it is an inner 1. Since the previously described frame-surrounding sequence is from the upper side to the lower side and from the left side to the right side, the acquired contour sequence can match their width without error resulting from the wrong sequence.

The compressed character vector generating module 32 is used to combine the contour vector direction codes produced by module 33 with the filling control points produced by module 34 to form a Chinese character compression vector 38.

The data structure of the compressed character vector is shown in FIG. 4. Each character compression vector takes up one record, which includes the outline vector and the filling control point. The outline vector further includes the total number of points on the outline, the coordinates of the initial points, the segment direction, and the repeating number of the segment direction. The filling control point includes the filling control points of characters for various resolutions. The character compression vector 38 is recorded in the ROM of the character generating sub-system 4, the operation of which is described below.

Figure 3:
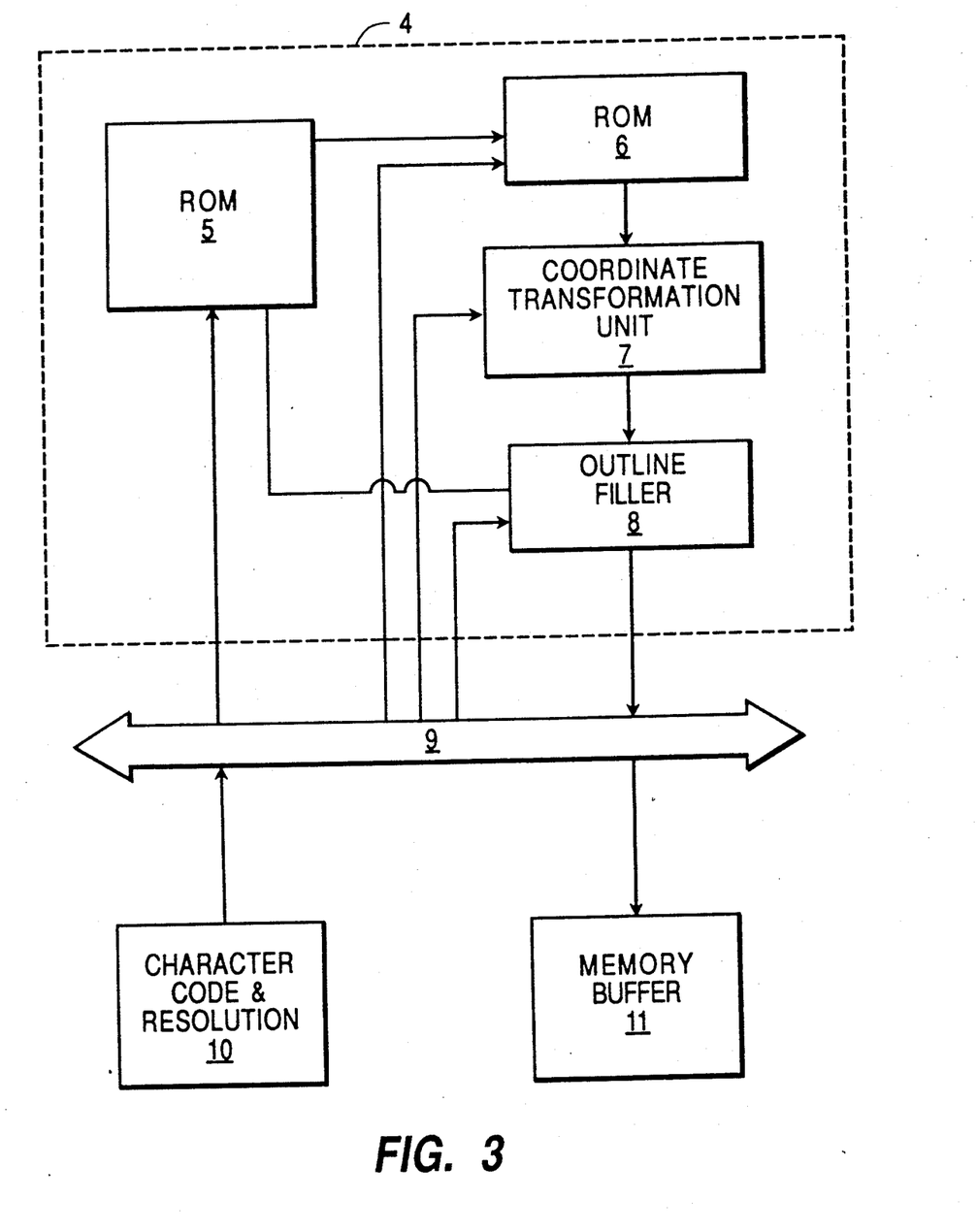
FIG. 3 is a block diagram of a circuit board to be mounted in a PC for realtime generation of printed Chinese characters according to the present invention.

FIG. 3 illustrates the structure of the printed Chinese character realtime generating sub-system 4, which comprises:

1. A ROM 5 for storing the compressed Chinese character vector, and for re-generating the character outline and the Chinese character pattern.

2. A RAM 6. Upon a Chinese character code and a specified Chinese resolution being put in the printed Chinese character realtime generating sub-system 4, the sub-system 4 can, in accordance with the character code and the resolution, 10, locate the compressed character pattern vector in ROM 5. The character pattern vector is then for generating the dot matrix character pattern outline, which is to be stored in RAM for later processing. Simultaneously, the specific resolution value is also loaded into the RAM 6 so as to enlarge or to compress the outline of a character.

3. A coordinate transformation unit 7. The dot matrix character pattern outline in the RAM 6 can be enlarged or shrunk into the character outline of a specific resolution. During the course of enlarging or shrinking, the dot coordinate on the outline is transformed into the corresponding dot coordinate on the enlarged or shrunk outline of a given resolution using the following equations:

$$X' = X * r_x \quad (I)$$

$$Y' = Y * r_y \quad (II)$$

OR $$X' = (X-1) * r_x + 1 \quad (III)$$

$$Y' = (Y-1) * r_y + 1 \quad (IV)$$

in which X and Y stand for the conventional coordinates, X' and Y' stand for the coordinates transformed, $r_x$ stands for the enlarged or shrunk multiple (or times) in the lateral coordinate direction, and $r_y$ stands for the enlarged or shrunk multiple in the longitudinal coordinate direction. The equations for shrinking the character pattern are equations III and IV. Before selecting the equation for enlarging the character pattern, a point on the character outline must be distinguished as to whether it is an inner outline point or an outer outline point so as to determine the moving direction during enlarging. If that point is moving to the right, equation I is used for coordinate transformation; if that point is moving downward, equation II is used; if that point is moving to the left, equation III is used; if that point is moving upward, equation IV is used. Since each of the coordinate transforming equations simply involves a multiplying operation transforming equations simply involves a multiplying operations and an addition operation, only a simple hardware circuit is required.

4. An outline filler 8. After a character outline has been enlarged or shrunk into a specific resolution, the outline filling control point must be retrieved from the ROM 5 so as to fill the outline into a Chinese character. According to the present invention, the filling method is to fill the outline from the control point to move rightwards, upwards, leftwards and downwards. The cursor is moved rightwards to fill black points directly to the edge of the outline, then, the cursor is moved one step upwards, or leftwards, or downwards before starting to move rightwards again. In case of being unable to move rightwards, upwards, leftwards, or downwards, the cursor is moved one step backwards from the previous black point, then, the aforesaid steps are repeated. The same filling steps are repeated until the entire outline is filled. After the outline has been filled, the procedure of forming a Chinese character is completed. A Chinese character pattern can then be printed on the printer or displayed through the system bus 9 and the memory buffer 11.

Figure 7:
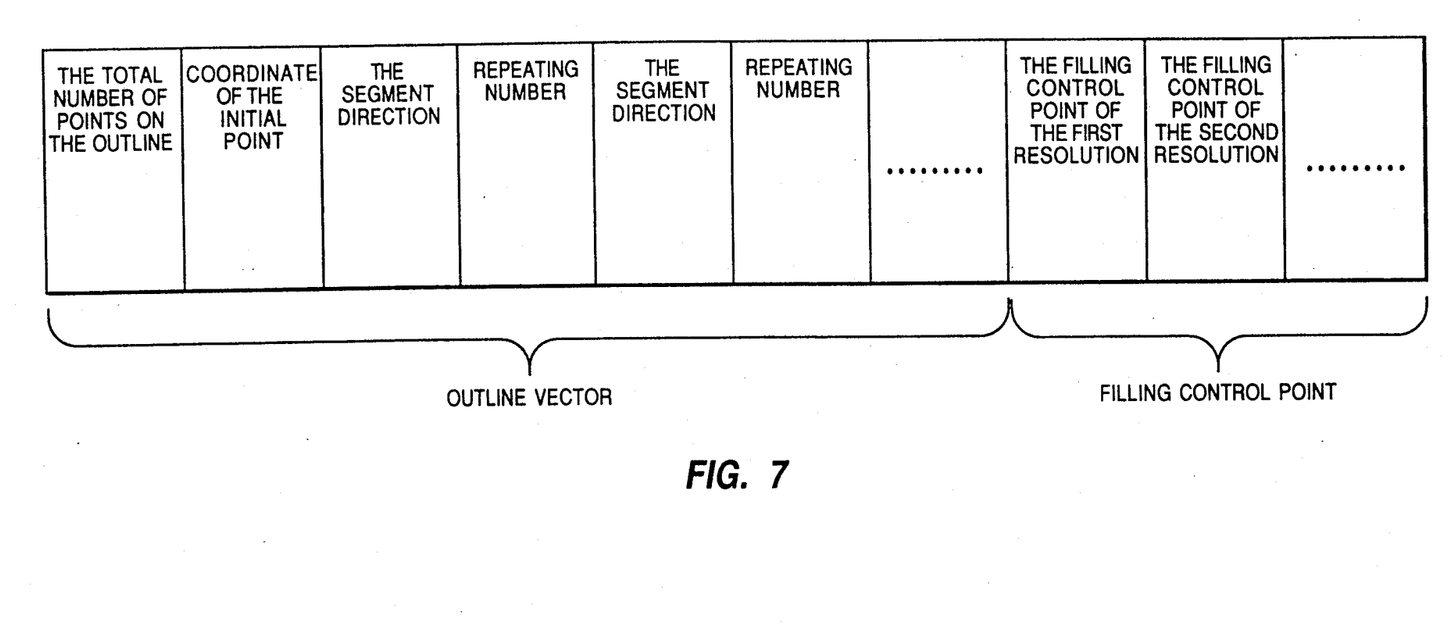
FIG. 7 illustrates the vector data of the compressed Chinese character.
Figure 8:
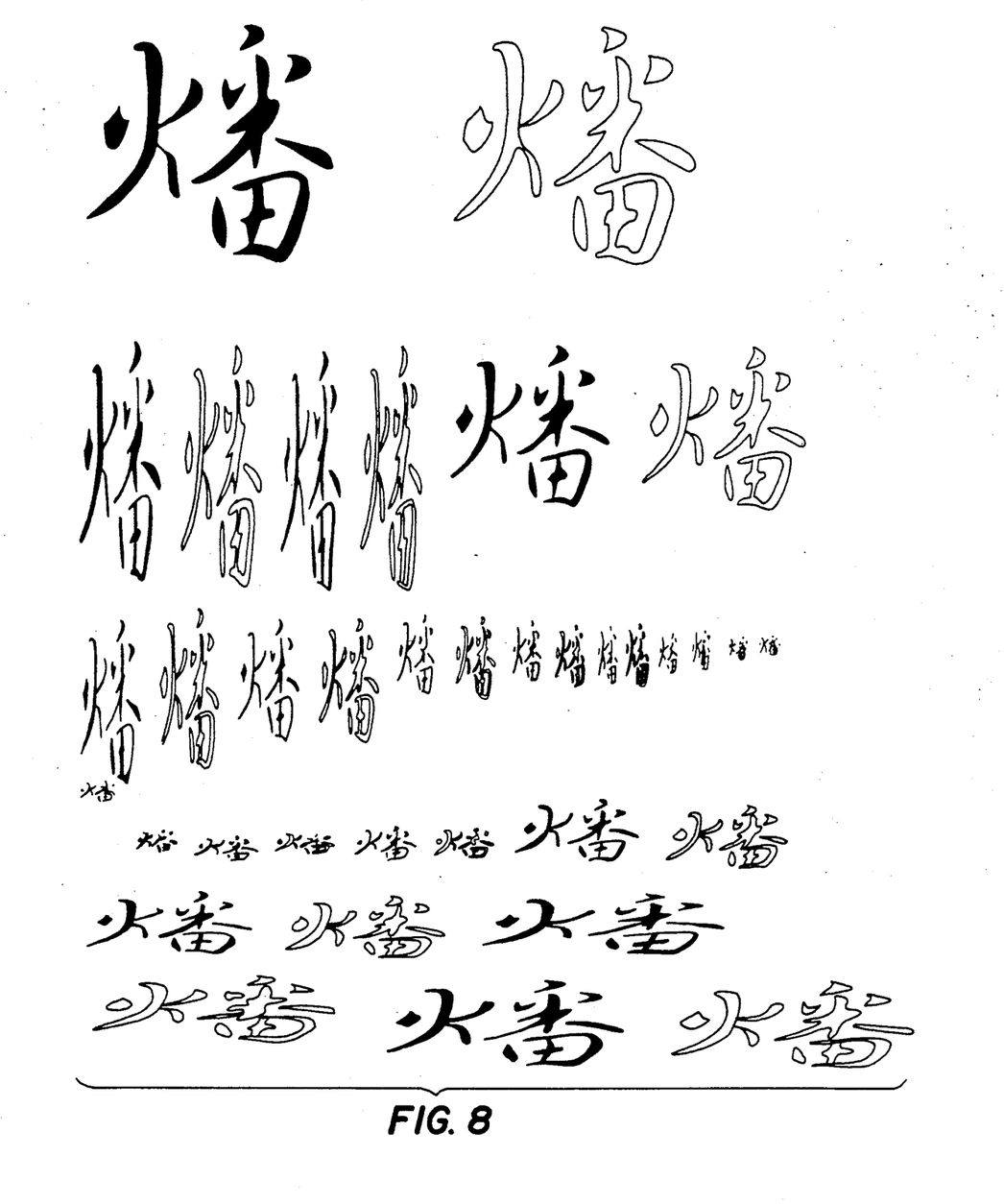
FIG. 8 illustrates the Chinese characters after having been enlarged and shrunk.

FIG. 7 is an illustration of the resultant characters which are generated according to the present invention.

Briefly, the system of the present invention can operate automatically, instead of being operated manually, to input a dot matrix Chinese character into a "Chinese character compression sub-system" so as to obtain a compressed character vector, which is then coupled with the circuit board of a PC. The circuit board with a simple hardware circuit can perform the enlargement, the shrinkage, and the outline filling operation so as to obtain a high quality Chinese character.

The system according to the present invention can save manpower, time and basic cost so as to output a large number of Chinese character patterns with various styles and various resolutions within a short period of time using circuit board of a PC. The system of the present invention not only can generate various character patterns such as the formal style, the running style, the official style and others, but also can be used in Chinese electronic publishing and Chinese Desktop publishing operations. It is deemed that the present invention can improve and elevate the Chinese computer utilization.

We claim:

1. A realtime generating system for generating multifont and multiresolution characters comprising:
   a character compression means for compressing a dot matrix character pattern into a vector type character pattern, said character compression means including means for locating outline points defining an outline of said dot matrix character pattern, and an outline vector generating means for generating vectors in accordance with said outline points;

said outline vector generating means including means for storing a plurality of direction codes each denoting a predetermined vector direction, and means for generating as said vectors a plurality of vector codes connecting adjacent outline points using said plurality of direction codes and distances between adjacent outline points; and, a realtime character generating means for generating a character pattern in accordance with said vector type character pattern, said realtime character generating means including a first memory for storing said vector type character pattern received from said character compression means, a second memory for storing said outline of said dot matrix character pattern, a coordinate converting means for enlarging and shrinking said outline of said dot matrix character pattern into a character outline having a specified resolution, and an outline filler means for filling the character outline to complete the character pattern.

2. A realtime generating system as claimed in claim 1, wherein said character compression means further includes, a zooming means for enlarging and narrowing said character pattern in accordance with said vectors, a filling control point selecting means for selecting an optimal filling point, an inner/outer outline distinction means for identifying inner and outer contours, and a compressed character vector generating means for generating said vector character pattern.

3. A realtime generating system as claimed in claim 2 wherein, said outline locating means includes means for registering a pair of horizontal end points for each of a plurality of horizontal segments of said dot matrix character pattern, means for registering a pair of vertical end points for each of a plurality of vertical segments of said dot matrix character pattern, and means for registering cross points of said horizontal and vertical segments, wherein said horizontal end points, and vertical end points and said cross points together comprise said outline points which define said outline of said dot matrix character pattern.

4. A realtime generating system as claimed in claim 3, said vector generating means further including means for combining into a single vector code a plurality of vector codes of adjacent vectors having a same direction code.

5. A realtime generating system as claimed in claim 2, said vector generating means further including means for combining into a single vector code a plurality of vector codes of adjacent vectors having a same direction code.

6. A realtime generating system as claimed in claim 2, said dot matrix character pattern denoting Chinese characters.

7. A realtime generating system as claimed in claim 1 wherein, said outline locating means includes means for registering a pair of horizontal end points for each of a plurality of horizontal segments of said dot matrix character pattern, means for registering a pair of vertical end points for each of a plurality of vertical segments of said dot matrix character pattern, and means for registering cross points of said horizontal and vertical segments, wherein said horizontal end points, and vertical end points and said cross points together comprise said outline points which define said outline of said dot matrix character pattern.

8. A realtime generating system as claimed in claim 7, said vector generating means further including means for combining into a single vector code a plurality of vector codes of adjacent vectors having a same direction code.

9. A realtime generating system as claimed in claim 1, said vector generating means further including means for combining into a single vector code a plurality of vector codes of adjacent vectors having a same direction code.

10. A realtime generating system as claimed in claim 1, said dot matrix character pattern denoting Chinese characters.

* * * * *